(12) United States Patent
Col et al.

(10) Patent No.: US 7,055,022 B1
(45) Date of Patent: May 30, 2006

(54) PAIRED LOAD-BRANCH OPERATION FOR INDIRECT NEAR JUMPS

(76) Inventors: Gerard M. Col, 11008 Conchos Tr., Austin, TX (US) 78726; G. Glenn Henry, 411 Lake Cliff Trail, Austin, TX (US) 78746; Terry Parks, #6 Carriage House La., Austin, TX (US) 78737

( * ) Notice: Subject to any disclaimer, the term of this patent is extended or adjusted under 35 U.S.C. 154(b) by 430 days.

(21) Appl. No.: 10/279,216

(22) Filed: Oct. 22, 2002

Related U.S. Application Data

(60) Provisional application No. 60/345,448, filed on Oct. 23, 2001.

(51) Int. Cl.
*G06F 9/22* (2006.01)
(52) U.S. Cl. ...................... 712/233; 712/243
(58) Field of Classification Search ................ 712/233, 712/242, 243
See application file for complete search history.

(56) References Cited

U.S. PATENT DOCUMENTS

| | | | |
|---|---|---|---|
| 5,041,968 A | * | 8/1991 | Yamaguchi ................. 712/208 |
| 5,222,244 A | * | 6/1993 | Carbine et al. ................ 712/41 |
| 5,359,718 A | | 10/1994 | Phillips et al. |
| 6,338,136 B1 | | 1/2002 | Col et al. |

* cited by examiner

*Primary Examiner*—William M. Treat

(57) ABSTRACT

A microprocessor apparatus is provided for performing an indirect near jump operation that includes paired operation translation logic, load logic, and execution logic. The paired operation translation logic receives an indirect near jump macro instruction, and generates a load-jump micro instruction, where the load-jump micro instruction directs load logic to retrieve an offset and directs the execution logic to generate a target address. The load logic is coupled to the paired operation translation logic and receives the load-jump micro instruction. The load logic retrieves the offset from memory, where the offset indicates a jump destination that is relative to an instruction address corresponding to the indirect near jump macro instruction. The execution logic is coupled to the load logic. The execution logic receives the offset, and employs the instruction address and the offset to generate the target address specifying the jump destination for the near jump operation.

16 Claims, 3 Drawing Sheets

Pipeline Microprocessor

Indirect Near Jump Operations

| CYCLE | FETCH | TRANSLATE | REGISTER | ADDRESS | DATA/ALU | WRITE BACK |
|---|---|---|---|---|---|---|
| 1 | JMP [EAX] | --- | --- | --- | --- | --- |
| 2 | STALL | LD T1,[EAX] | --- | --- | --- | --- |
| 3 | --- | JMP T1 | LD T1,[EAX] | --- | --- | --- |
| 4 | --- | --- | JMP T1 | LD T1,[EAX] | --- | --- |
| 5 | --- | --- | --- | JMP T1 | LD T1,[EAX] | --- |
| 6 | --- | --- | --- | --- | JMP T1 | LD T1,[EAX] |
| 7 | --- | --- | --- | --- | --- | JMP T1 |

2 CYCLES

Fig. 4

*Paired Load-Branch Operation*

400

| CYCLE | FETCH | TRANSLATE | REGISTER | ADDRESS | LOAD | EXECUTE |
|---|---|---|---|---|---|---|
| 1 | JMP [EAX] | --- | --- | --- | --- | --- |
| 2 | --- | LDJMP [EAX] | --- | --- | --- | --- |
| 3 | --- | --- | LDJMP [EAX] | --- | --- | --- |
| 4 | --- | --- | --- | LDJMP [EAX] | --- | --- |
| 5 | --- | --- | --- | --- | LDJMP [EAX] | --- |
| 6 | --- | --- | --- | --- | --- | LDJMP [EAX] |

1 CYCLE

PAIRED LOAD-BRANCH OPERATION FOR INDIRECT NEAR JUMPS

CROSS-REFERENCE TO RELATED APPLICATIONS

This application claims the benefit of U.S. Provisional Application Ser. No. 60/345,448 filed on Oct. 23, 2001.

BACKGROUND OF THE INVENTION

1. Field of the Invention

This invention relates in general to the field of microelectronics, and more particularly to apparatus in a pipeline microprocessor for efficiently performing indirect near jump operations.

2. Description of the Related Art

Early microprocessors executed one instruction at a time. Accordingly, each individual instruction was fetched from memory, and all of the functions prescribed by the instruction were executed by functional units within the microprocessors until all the functions were completed. At that point, the individual instruction was retired and a next instruction was fetched from memory for execution.

Although execution of program instructions in an early microprocessor was simple to understand, the practical affect of their execution was quite slow. Since that time, microprocessor designers have repeatedly focused on modifying the architecture of microprocessors to improve the execution speed, or throughput, of instructions. More recently, pipeline architectures have prevailed. A pipeline architecture breaks down the functional units of a microprocessor into a sequence of successive operations, very much analogous to the staging of an assembly line. Accordingly, it is possible-and highly desirable from a throughput standpoint-that a particular stage of the microprocessor is performing an operation prescribed by a first instruction while a stage immediately preceding the particular stage is performing another operation prescribed by a second instruction that follows the first instruction in an application program. Efficient throughput in a microprocessor is attained when all pipeline stages are performing operations. Problems of inefficiency occur when a particular pipeline stage takes too long to perform its prescribed operation. In this circumstance, a stall signal is issued to preceding pipeline stages that force them to hold until the particular pipeline stage completes its function.

Pipeline architectures have continued to evolve to the point that many operations that are prescribed by programs instructions (also called macro instructions) can be accomplished in a single traversal of the pipeline. For example, a register-to-register add operation is accomplished by retrieving two register operands simultaneously from registers within a register stage, adding the two operands together to produce a result in a following execution stage, and finally writing the result back to a result register in a result write back stage that follows the execution stage. A single instruction to perform the register-register add operation is thus configured to propagate through successive pipeline stages in synchronization with a pipeline clock, and the end outcome is that a user experiences register-to-register addition in a single pipeline cycle.

Although many macro instructions can be executed in a single traversal through the pipeline, there remain numerous instructions whose prescribed operations are so complex that they cannot be executed in a single traversal. One particular example is an indirect near jump instruction that prescribes an indirect near jump operation. The indirect near jump operation requires that a jump offset be retrieved from memory and added to a current instruction pointer in order to generate a target address for transfer of program control. But most present day microprocessors provide a single pipeline stage that is capable either of 1) accessing operands in memory or 2) performing an arithmetic or logical computation using provided operands. Both of these types of operations cannot be performed during the same pipeline cycle. Accordingly, an indirect near jump operation requires that two sub-operations be performed as the instruction proceeds through the pipeline. First, the offset data must retrieved from memory. Following this, the offset data is employed along with the instruction pointer to generate the target address. Subsequent fetching of instructions is stalled while the operation to retrieve the offset from memory is provided. When the addition operation is provided, fetching is allowed to resume.

Any type of operation in a pipeline microprocessor that requires multiple pipeline cycles to accomplish is problematic in that inefficient utilization of the pipeline stages is experienced. Therefore, what is needed is an apparatus in a microprocessor that enables an indirect near jump operation to be accomplished in a single pipeline cycle.

SUMMARY OF THE INVENTION

The present invention, among other applications, is directed to solving these and other problems and disadvantages of the prior art. The present invention provides a superior technique for accomplishing indirect near jump operations in a pipeline microprocessor. In one embodiment, a microprocessor apparatus is provided for performing an indirect near jump operation. The microprocessor apparatus includes paired operation translation logic, load logic, and execution logic. The paired operation translation logic receives an indirect near jump macro instruction, and generates a load-jump micro instruction, where the load-jump micro instruction directs pipeline stages in a microprocessor to perform the indirect near jump operation. The load logic is coupled to the paired operation translation logic and receives the load-jump micro instruction. The load logic retrieves an offset from memory, where the offset indicates a jump destination that is relative to an instruction address corresponding to the indirect near jump macro instruction. The execution logic is coupled to the load logic. The execution logic receives the offset, and employs the instruction address and the offset to generate a target address specifying the jump destination for the near jump operation. The load-jump micro instruction directs the load logic to retrieve the offset and directs the execution logic to generate the target address. In addition, the load logic comprises a first one of the pipeline stages and the execution logic comprises a second one of the pipeline stages. The second one of the pipeline stages immediately follows the first one of the pipeline stages.

One aspect of the present invention contemplates an apparatus in a microprocessor for executing an indirect near jump macro instruction. The apparatus has a paired operation translator that translates the indirect near jump macro instruction into a load-jump micro instruction that directs the microprocessor to perform two operations. The two operations are performed by two successive stages of the microprocessor. The two successive stages include a load stage and an execute stage. The load stage performs a first one of the two operations, where the first one of the two operations includes retrieving offset data from a location in memory.

The execute stage is coupled to the load stage. The execute stage performs a second one of the two operations, where the second one of the two operations includes receiving the offset data and employing the offset data along with an instruction pointer corresponding to the indirect near jump macro instruction to generate a jump target address, and where the execute stage immediately follows the load stage in the microprocessor.

Another aspect of the present invention comprehends a mechanism in a pipeline microprocessor for performing an indirect near jump operation. The mechanism has a load-jump micro instruction and load logic. The load-jump micro instruction corresponds to an indirect near jump macro instruction received and translated by translation logic. The load logic receives the load-jump micro instruction and retrieves offset data from a memory location, and provides the offset data to execution a logic in an immediately following stage of the pipeline microprocessor, where the execution logic generates a target address for the indirect near jump operation in a single pipeline cycle. The load-jump micro instruction directs the load logic to retrieve the offset data and also directs the execution logic to generate the target address.

BRIEF DESCRIPTION OF THE DRAWINGS

These and other objects, features, and advantages of the present invention will become better understood with regard to the following description, and accompanying drawings where:

FIG. 4 is a table showing execution of an indirect near jump instruction by the microprocessor of FIG. 3.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion pertaining to the execution of indirect jump instructions in present day pipeline microprocessors, prior art examples will now be discussed with reference to FIGS. 1–2 that clearly illustrate limitations in conventional pipeline architectures that preclude efficient execution of indirect near jumps. Following this, a description of the present invention is provided with reference to FIGS. 3–4. Within a microprocessor according to the present invention, indirect near jump operations are performed in less than half the number of pipeline cycles over that exhibited by present day microprocessors.

Figures 1, 2:
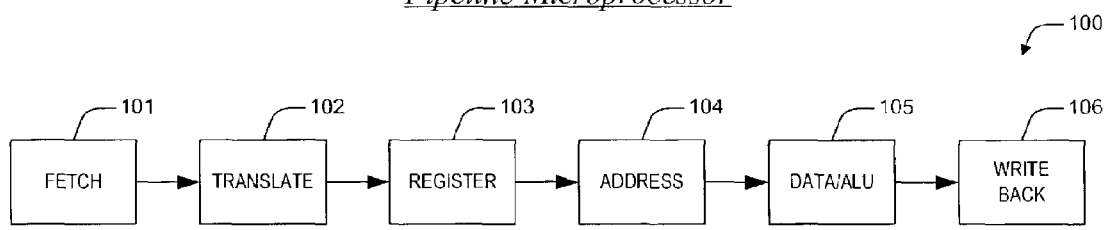
FIG. 1 is a block diagram illustrating pipeline stages of a prior art pipeline microprocessor.
FIG. 2 is a table depicting execution of an indirect near jump instruction by the microprocessor of FIG. 1.

Referring to FIG. 1, a block diagram is presented illustrating stages of a related art pipeline microprocessor 100. The microprocessor 100 includes a fetch stage 101, translate stage 102, register stage 103, address stage 104, data/ALU stage 105, and write back stage 106.

In operation, the fetch stage 101 retrieves macro instructions from external memory (not shown) that are to be executed by the microprocessor 100. The translate stage 102 translates the fetched macro instructions into associated micro instructions. The register stage 103 retrieves operands specified by the micro instructions from a register file (not shown) for use by logic (not shown) within subsequent stages 104–106 of the pipeline. The address stage 104 generates memory addresses specified by the micro instructions to be used in data storage and retrieval operations. The data/ALU stage 105 either performs arithmetic, logical, or other prescribed operations to generate results using the operands retrieved from the register file; or accesses the external memory to store or retrieve memory operands using the addresses generated in the address stage 104. The write back stage 106 updates registers in the register file with the results generated or obtained from the external memory in the data/ALU stage 106. Micro instructions proceed in sequence through each successive stage of the pipeline in synchronization with a pipeline clock signal (not shown). To achieve optimum pipeline performance, while a given micro instruction is executing in a given stage of the pipeline, a preceding micro instruction should be executing in a subsequent pipeline stage and a following micro instruction should be executing in a previous pipeline stage. In other words, during any given pipeline cycle, all stages 101–106 of the microprocessor 100 should be performing their architected functions; no stage should be idle.

But optimum pipeline throughput is rarely attained because many of the operations that are prescribed by macro instructions are so complex that the operations must be broken down into two or more sub-operations, where each of the sub-operations is prescribed by a corresponding micro instruction. Thus, when the translate stage 102 is provided with one of this type of macro instructions, the pipeline stages prior to the translate stage 102 must be stalled while the translate stage 102 generates micro instructions to accomplish the complex operation. If a particular operation prescribed by a macro instruction can be implemented via a single micro instruction that can proceed unimpeded through the pipeline, then the prescribed operation is referred to as a single-cycle operation. If the particular operation requires, say, three micro instructions, then it is referred to as a 3-cycle operation. Clearly, it is advantageous to reduce the number of micro instructions that are required to implement an operation that is prescribed by a macro instruction.

Operations, or functions, that are prescribed by macro instructions are deemed complex for many reasons. One particular reason for complexity that is addressed by the present invention is due to the architectural layout, or allocation, of logic functions in conventional pipeline microprocessors. For instance, if a macro instruction prescribes an operation that requires more than one mutually exclusive sub-operation to be performed in a particular pipeline stage 101–106, then the macro instruction has to be broken down into corresponding micro instructions, each prescribing one of the mutually exclusive sub-operations. Accordingly, a first micro instruction directs the particular pipeline stage 101–106 to perform a first mutually exclusive sub-operation. The first micro instruction is followed by a second micro instruction that directs the particular pipeline stage 101–106 to perform a second mutually exclusive sub-operation. And the generation of subsequent micro instructions continues until all of the mutually exclusive sub-operations have been directed and executed.

A particular example of the multiple micro instruction problem described above has been observed by the present inventors and will now be described with reference to FIG. 2.

Referring to FIG. 2, a table 200 is presented depicting execution of an indirect near jump instruction by the microprocessor 100 of FIG. 1. The table 200 has seven columns, one for each of the pipeline stages 101–106 discussed above with reference to FIG. 1 along with a CYCLE column, that indicates pipeline cycles associated with the propagation of instructions through the pipeline stages 101–106 of the microprocessor 100. The numbers in the CYCLE column refer to sequential pipeline cycles, each of which corresponds to a specific number of cycles of a pipeline, or core, clock signal (not shown) within the microprocessor 100. One skilled in the art will appreciate that in a present day pipeline microprocessor 100, generally speaking, one pipeline cycle corresponds to one core clock cycle. Instructions of interest to the present discussion are depicted explicitly in the FETCH-WRTIE BACK columns; preceding and following instructions which are not relevant to the present discussion are depicted as "- - - ." A stall in the microprocessor pipeline is designated as "STALL." A stall occurs when a particular pipeline stage 101–106 is precluded from performing its designated function for the corresponding pipeline cycle.

The example of FIG. 2 is presented to describe limitations of a conventional microprocessor 100 that result in the requirement for generation of multiple micro instructions to accomplish mutually exclusive sub-operations associated with an operation prescribed by a particular macro instruction, JMP [EAX]. The particular macro instruction, JMP [EAX], is an indirect near jump macro instruction according to architectural conventions commensurate with an x86-compatible microprocessor. x86 conventions are employed in this example because x86-compatible microprocessors and their associated macro instructions are widely understood in the industry, however, one skilled in the art will appreciate that the problem discussed below is prevalent in microprocessor architectures other than x86.

During cycle 1, logic in the fetch stage 101 of the microprocessor 100 retrieves, or fetches, the indirect near jump macro instruction, JMP [EAX], from memory (not shown). One skilled in the art will appreciate that the term "memory," as used herein in the context of a pipeline microprocessing system, applies to any form of programmable or intermediate program storage media, to include disk, read-only memory (ROM), random access memory (RAM), off-chip and on-chip cache memory, etc. A macro opcode, JMP, directs the microprocessor 100 to perform an unconditional jump (also referred to as a branch) to a new location whose address (also referred to as a jump target address, jump target, or target address) is prescribed relative to the address of the indirect near jump macro instruction. The address of the near jump macro instruction is referred to as the instruction address, or the current instruction pointer, or the current program counter. To determine the target address, offset data (also known as an offset), positive or negative, is added to the instruction address. The offset data is not directly prescribed by the indirect near jump macro instruction; the offset data is stored in a location in data memory (not shown) whose address is stored in a register, EAX, in the microprocessor 103. To accomplish the indirect near jump operation prescribed by JMP [EAX], the microprocessor 100 must first access register EAX to obtain the address of the offset data in memory. Once the address of the offset data is obtained, the microprocessor 100 must access the address in memory to retrieve the offset. Then the offset must be summed with the instruction address of the indirect near jump macro instruction, JMP [EAX], resulting in generation of the jump target address. Following generation of the jump target address, program control logic (not shown) in the microprocessor 100, will begin fetching instructions sequentially from the target address. During cycle 1, the indirect near jump macro instruction, JMP [EAX], is provided in an instruction buffer (not shown) for access by logic in the translate stage 102 during the following cycle.

During cycle 2, the indirect near jump macro instruction, JMP [EAX], proceeds through the translate stage 102. Therein, the indirect near jump macro instruction, JMP [EAX], is translated into two micro instructions. A first micro instruction, LD T1, [EAX], directs the microprocessor 100 1) to retrieve the offset address in memory from register EAX, 2) to retrieve the offset data from memory using the address provided by EAX, and 3) to store the retrieved offset in register T1. A second micro instruction, JMP T1, directs the microprocessor to unconditionally branch to a location whose address is stored in register T1. T1 is a register within the microprocessor 100 that is architecturally invisible, that is, it cannot be specified via macro instructions.

The indirect near jump operation prescribed by the indirect near jump macro instruction, JMP [EAX], must be broken down into the two micro instructions, LD T1, [EAX] and JMP T1, because two mutually exclusive sub-operations must be performed in the data/ALU stage 102 in order to perfect the indirect near jump operation. Recall from the discussion with reference to FIG. 1 that the data/ALU stage 105 either performs arithmetic, logical, or other prescribed operations to generate results using the operands retrieved from the register file; or accesses the external memory to store or retrieve memory operands using the addresses generated in the address stage 104. And to perfect the indirect near jump operation, the data/ALU stage 105 must 1) access external memory to retrieve the offset data for the jump and 2) generate the target address using the instruction address of the JMP [EAX] along with the relative offset. But since the data/ALU stage 105 can only perform one of these two sub-operations during a given pipeline cycle, the two micro instructions, LD T1, [EAX] and JMP T1, are required. Since accomplishment of an indirect near jump operation requires two micro instructions, it is accordingly referred to as a 2-cycle operation.

Hence, during cycle 2, the translate stage 102 generates the first micro instruction, LD T1, [EAX]. Also during cycle 2, a STALL is provided to the fetch stage 101 to preclude fetching of subsequent instructions because the translate stage 102 requires an additional pipeline cycle to generate the second micro instruction, JMP T1.

During cycle 3, the first micro instruction LD T1, [EAX], proceeds through the register stage 103. Therein, register EAX is accessed to retrieve the memory address of the offset data. Also during cycle 3, the translate stage 102 generates the second micro instruction, JMP T1. Additionally during cycle 3, the STALL is removed from the fetch stage 101.

During cycle 4, LD T1, [EAX] proceeds through the address stage 104. Therein the memory address retrieved from EAX during cycle 3 is translated for presentation over a system memory bus. One skilled in the art will appreciate that present day microprocessors 100 often employ virtual addressing schemes that require translation of virtual addresses to physical addresses in order to access memory over a system memory bus. Also during cycle 4, JMP T1 proceeds through the register stage 103. Therein, no functions are prescribed.

During cycle 5, LD T1, [EAX] proceeds through the data/ALU stage 105. Therein, the translated address provided by the address stage 104 is employed to access the location in memory to retrieve the offset data for the indirect near jump operation and the offset is stored in register T1, which is accessible by following micro instructions. Also during cycle 5, JMP T1 proceeds through the address stage 104. Therein, no functions are prescribed.

During cycle 6, LD T1, [EAX] proceeds through the write back stage 106. Therein, no functions are prescribed, and the first micro instruction, LD T1, [EAX] completes execution. Also during cycle 6, JMP T1, proceeds through the data/ALU stage 105. Therein, the offset data is retrieved from register T1 and is employed along with the instruction address of the indirect near jump macro instruction, JMP [EAX], to generate the target address for the jump. The jump target address is hence provided to program control logic so that the indirect near jump can be accomplished.

During cycle 7, JMP T1 proceeds through the write back stage 106. Therein, no functions are prescribed and the second micro instruction completes execution.

For clarity purposes, the above discussion does not describe other well-known features of a present data pipeline microprocessor 100 that are employed to expedite program control transfer operations such as branch prediction and branch control techniques. One skilled in the art will appreciate that generated target addresses are provided to branch control logic in the fetch stage 101 to alter fetching of program macro instructions and also that branch predication techniques allow for speculative fetching and execution of subsequent macro instructions prior to generation of the target address. However, given the mutually exclusive limitations of the data/ALU stage 105 as described herein in a conventional microprocessor 100, a limitation persists in the case of indirect near jump operations that results in a 2-cycle operation, thus decreasing pipeline efficiency.

The present inventors have noted that indirect near jump operations are widely employed in present day application programs for desktop or laptop computers. Consequently, the pipeline inefficiencies discussed above with reference to FIGS. 1 and 2 result in slower execution, which is disadvantageous from a user perspective. Accordingly, the present invention is presented to overcome the aforementioned problems. The present invention, now discussed with reference to FIGS. 3 and 4, enables single-cycle execution of an indirect near jump operation by virtue of a novel allocation of functions and corresponding logic within a microprocessor pipeline and an associated indirect near jump micro instruction that exploits these novel pipeline features.

Figure 3:
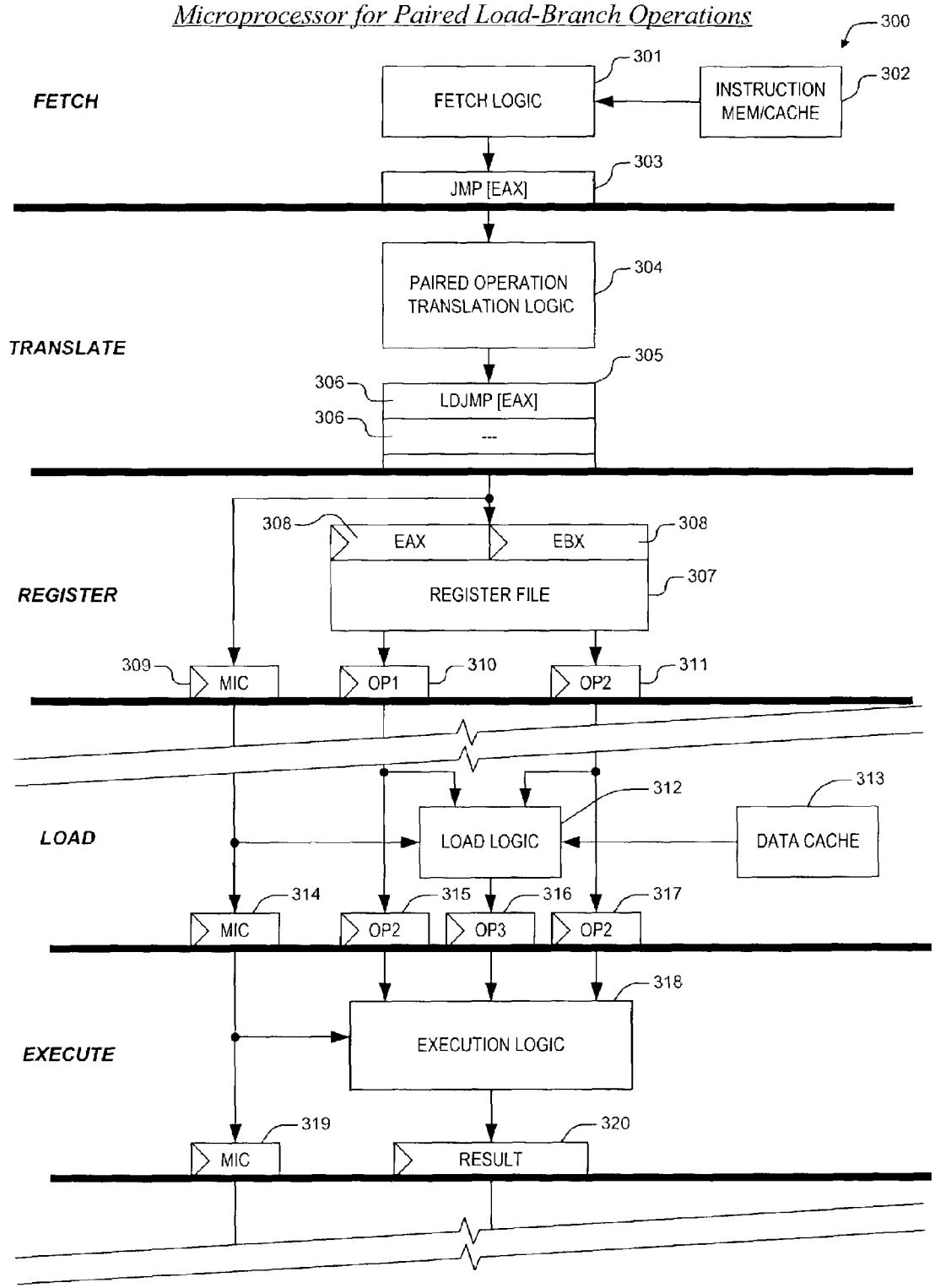
FIG. 3 is a block diagram featuring a microprocessor for paired load-branch operations according to the present invention.

Turning now to FIG. 3, a block diagram is presented featuring a microprocessor 300 for paired load-branch operations according to the present invention. The microprocessor has a fetch stage that includes fetch logic 301, a translate stage that includes paired operation translation logic 304 along with a micro instruction queue 305, a register stage that has a register file 307, a load stage including load logic 312, and an execute stage that includes execution logic 318. For clarity purposes, stages preceding the load stage (e.g., an address stage) and following the execute stage (e.g., a write back stage) are not shown. In contrast to the conventional microprocessor 100 discussed with reference to FIGS. 1–2, the microprocessor 300 according to the present invention has allocated memory retrieval functions to a load stage that is separate from an execute stage that is provided to perform arithmetic and logical functions. The microprocessor also includes paired operation translation logic 304 that advantageously exploits the separate load and execute stages in order to reduce the number of pipeline cycles that are required for execution of paired load-execute functions, one of which is an indirect near jump operation.

Operationally, the fetch logic 301 fetches macro instructions from external memory 302 or instruction cache 302 and provides these macro instructions to an instruction buffer 303. The paired operation translation logic 304 receives the macro instructions from the instruction buffer 303 and translates the macro instructions into a corresponding sequence of micro instructions that direct the microprocessor to accomplish the operations prescribed by the macro instructions. Each generated micro instruction is provided in sequence to a queue buffer 306 in the micro instruction queue. If an indirect near jump macro instruction is received from the instruction buffer 303, as is exemplified by the x86 indirect near jump macro instruction, JMP [EAX] in the block diagram, then the paired operation translation logic 304 translates the indirect near jump macro instruction into a single load-jump micro instruction that directs the microprocessor 300 1) to access a register prescribed by the indirect near jump macro instruction (e.g., register EAX in the example of FIG. 3) to obtain a memory location of an offset for the near jump operation, 2) to access a data cache 313 (or external memory if not available in the data cache 313) at the memory location to retrieve the offset for the jump operation, and 3) to generate a jump target address for the indirect near jump operation using the offset as has been described above. It is possible to prescribe all three of the above-noted tasks in a single micro instruction according to the present invention because retrieval of memory data (i.e., the offset) for a pending computation in the execute stage are no longer mutually exclusive operations. In fact, although an indirect near jump operation is employed as a vehicle to describe aspects of the present invention, one skilled in the art will appreciate that the scope of the present invention contemplates any form of paired load-execute function, such as a load-add, load-subtract, load-logical, where an operand required for computation in the function must first be retrieved from memory 313.

The register stage retrieves micro instructions in order from the queue positions 306 in the micro instruction queue 305. If a retrieved micro instruction directs access to registers 308 within the register file 307, then the register file 307 accesses the prescribed registers 308 and provides their contents in operand registers 310, 311. In addition, micro instructions are forwarded to the next pipeline stage in micro instruction buffer 309. For clarity sake, all of the other relevant information related to a particular micro instruction, including an instruction address corresponding to an associated macro instruction, is shown in the FIGURE as being forwarded via the micro instruction buffer 309.

Micro instructions and associated operands are forwarded down through subsequent stages until they reach the load stage, wherein the load logic 312 is employed to access the data cache 313 to retrieve data, if so prescribed by the micro instruction. The load logic 312 retrieves the data from the data cache 313 and provides it in a retrieved operand buffer 316 for access by the execution logic 318. The register operands are also forwarded to the execute stage in operand 1 buffer 315 and operand 2 buffer 317. Additionally, the micro instruction and other relevant information are forwarded to the execute stage in micro instruction buffer 314. In the particular case of a load-jump micro instruction according to the present invention, the load logic 312 accesses the data cache 313 to retrieve the offset for the indirect near jump operation and the offset is provided for access by execute logic 318 in the operand 3 buffer 316. The offset indicates a jump destination, or target address that is relative to an instruction address (provided along with other relevant micro instruction data) corresponding to the indirect near jump macro instruction.

The execution logic 318 receives the micro instruction and relevant information from micro instruction buffer 314 along with associated operand data from operand buffers 315–317 and performs prescribed operations to produce a result which is then provided to a result register 320. In addition, the micro instruction and associated information is forwarded to following stages via micro instruction buffer 319. In the particular case of a load-jump micro instruction, the execution logic 318 employs the offset data provide in operand 3 buffer 316 along with the instruction pointer for the corresponding indirect near jump macro instruction (received from micro instruction buffer 314) to generate a target address for the indirect near jump operation. The target address is provided in the result register 320, which is accessed by program control logic (not shown) to transfer control of the associated application program to the destination designated by the target address.

Now turning to FIG. 4, a table 400 is provided showing execution of an indirect near jump macro instruction by the microprocessor 300 of FIG. 3. The table 400 has seven columns, one for each of the relevant pipeline stages discussed above with reference to FIG. 3 along with a CYCLE column, that indicates pipeline cycles associated with the propagation of instructions through the pipeline stages of the microprocessor 300. Although an address stage is not depicted in the block diagram of FIG. 3 for clarity purposes, an ADDRESS stage column is shown in the table 400 to describe progression of micro instructions of interest. Also, for clarity purposes, only those stages up through the execute stage of the microprocessor 300 according to the present invention are depicted in the table 400. As was similarly discussed above with reference to the table 200 of FIG. 2, instructions of interest are depicted explicitly in the FETCH-EXECUTE columns; preceding and following instructions which are not relevant to the present discussion are depicted as "- - - ."

The example of FIG. 4 is presented to describe how a pipeline microprocessor according to the present invention overcomes the limitations of a conventional microprocessor 100 that result in the requirement for generation of multiple micro instructions to accomplish mutually exclusive sub-operations. In the example of FIG. 4, these sub-operations are associated with an operation prescribed by a particular x86 macro instruction, JMP [EAX], however, the x86 indirect near jump instruction is employed to exemplify aspects of the present invention. It is contemplated that novel features and aspects of the present invention are applicable to other microprocessor instruction set architectures and complex macro instructions wherein computations following load of an operand are required.

During cycle 1, fetch logic 301 in the fetch stage of the microprocessor 300 retrieves, or fetches, the indirect near jump macro instruction, JMP [EAX], from memory 302. As alluded to above, the term "memory" 302 applies to programmable or intermediate program storage media such as disk, ROM, RAM, cache, and the like. A macro opcode, JMP, directs the microprocessor 300 to perform an unconditional jump to a jump destination whose target address is prescribed relative to the instruction pointer corresponding to the indirect near jump macro instruction. To determine the target address, an offset must be retrieved from data memory 313 and added to the instruction pointer. The offset data is stored in a location in data memory 313 whose address is stored in a register 308, EAX in the register file 307.

During cycle 1, the indirect near jump macro instruction, JMP [EAX] is provided in the instruction buffer 303 for access by paired operation translation logic 304 during the following pipeline cycle.

During cycle 2, the indirect near jump macro instruction, JMP [EAX], is provided to the paired operation translator 304. And since the indirect near jump macro instruction, JMP [EAX], prescribes a load-jump operation that can be performed in a single cycle according to the present invention, the paired operation translation logic 304 translates the indirect near jump macro instruction, JMP [EAX], into a load-jump micro instruction, LDJMP [EAX]. The load-jump micro instruction, LDJMP [EAX] directs the microprocessor 300 1) to retrieve the offset address in memory from register EAX, 2) to retrieve the offset data from memory using the address provided by EAX, 3) to employ the offset data along with the instruction pointer associated with JMP [EAX] to generate a jump target address, and 4) to unconditionally branch the target address. In contrast to a conventional microprocessor 100, performing an indirect near jump operation according to the present invention does not require additional register storage (such as register T1 in the example of FIG. 2). Only one micro instruction, LDJMP [EAX], is required to accomplish the paired load-jump operation because functions are allocated to pipeline stages in the present invention such that load operations are not mutually exclusive to arithmetic or logical operations traditionally performed by execution logic 318. In one embodiment, the execution logic is an ALU 318. Thus, load-branch operations become single-cycle operations when executed on a microprocessor 300 according to the present invention.

During cycle 2, the paired operation translation logic 304 generates the load-jump micro instruction, LDJMP [EAX] and provides it to the micro instruction queue 305. Since LDJMP [EAX] is a single micro instruction, it is not necessary to issue a stall to the fetch logic 301. Fetching of macro instructions is allowed to proceed uninhibited.

During cycle 3, the load-jump micro instruction LDJMP [EAX], proceeds through the register stage wherein register EAX 308 is accessed within the register file 307 to retrieve the memory address of the offset for the near jump.

During cycle 4, LDJMP [EAX] proceeds through the address stage (not shown in FIG. 3). Therein, the memory address retrieved from EAX during cycle 3 translated for presentation over a system memory bus as has been previously described with reference to FIG. 2.

During cycle 5, LDJMP [EAX] proceeds through the load stage. Therein, load logic 312 employs the translated address provided by the address stage to access the location in memory 313 to retrieve the offset data for the indirect near jump operation. The offset is forwarded to the execute stage in operand 3 buffer 316.

During cycle 6, LDJMP [EAX] proceeds through the execute stage. Therein, execution logic 318 retrieves the offset data from the operand 3 buffer 316 along with the instruction pointer for the indirect near jump macro instruction from micro instruction buffer 314. The execution logic 318 thus can immediately generate the target address for the jump without having to wait for additional micro instructions or having to access additional registers. The jump target address is then provided to the result register 320 for access by program control logic so that the indirect near jump operation can be completed.

During following cycles, the load-jump micro instruction, LDJMP [EAX], proceeds through remaining pipeline stages of the microprocessor 300 whose operation is not relevant to this discussion. Although LDJMP [EAX] must propagate though subsequent pipeline stages in order to be retired from the pipeline, its operations are essentially complete when it exits the execution stage.

As was noted above in the discussion with reference to FIG. 2, for clarity purposes, other well-known program control features, such as speculative branch execution, are not discussed. It is sufficient herein to note that load-execute operations which are exemplified by the example of an indirect near jump operation, can be accomplished according to the present invention in a single pipeline cycle using a single micro instruction.

Although the present invention and its objects, features, and advantages have been described in detail, other embodiments are encompassed by the invention as well. For example, it is noted above that the number of micro instructions and commensurate pipeline cycles that are required to execute an indirect near jump operation are cut in half by employing advantageous aspects of the present invention. However, any type of load-execute operation, such as a load-add, load-subtract, load-logical, will experience the same advantages.

In addition, although macro instructions according to an x86-compatible microprocessor architecture are employed for teaching purposes, one skilled in the art will appreciate that the present invention comprehends any pipeline architecture whose pipeline stages relegate load and execute functions to two sequential sub-operations.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus for performing an indirect near jump operation, comprising:
   paired operation translation logic, for receiving an indirect near jump macro instruction, and for generating a load-jump micro instruction, wherein said load-jump micro instruction directs pipeline stages in a microprocessor to perform the indirect near jump operation;
   load logic, coupled to said paired operation translation logic, for receiving said load-jump micro instruction, and for retrieving an offset from memory, wherein said offset indicates a jump destination that is relative to an instruction address corresponding to said indirect near jump macro instruction; and
   execution logic, coupled to said load logic, for receiving said offset, and for employing said instruction address and said offset to generate a target address specifying said jump destination for the near jump operation;
   wherein said load-jump micro instruction directs said load logic to retrieve said offset and directs said execution logic to generate said target address; and
   wherein said load logic comprises a first one of said pipeline stages and said execution logic comprises a second one of said pipeline stages, and wherein said second one of said pipeline stages immediately follows said first one of said pipeline stages.

2. The microprocessor as recited claim 1, wherein said load-jump micro instruction proceeds through said first one of said pipeline stages in single pipeline cycle.

3. The microprocessor as recited claim 1, wherein said load-jump micro instruction proceeds through said second one of said pipeline stages in a single pipeline cycle.

4. The microprocessor as recited in claim 3, wherein said first pipeline stage forwards said offset and said load-jump micro instruction to said second pipeline stage for generation of said target address.

5. The microprocessor as recited in claim 1, wherein said indirect near jump macro instruction comprises an x86 indirect near jump macro instruction.

6. The microprocessor as recited in claim 1, wherein a memory address of said offset is stored in a register within said microprocessor, and wherein said indirect near jump macro instruction prescribes said register.

7. Apparatus in a microprocessor for executing an indirect near jump macro instruction, comprising:
   a paired operation translator, configured to translate the indirect near jump macro instruction into a load-jump micro instruction that directs the microprocessor to perform two operations, wherein said two operations are performed by two successive stages of the microprocessor, said two successive stages comprising:
      a load stage, configured to perform a first one of said two operations, wherein said first one of said two operations comprises retrieving offset data from a location in memory; and
      an execute stage, coupled to said load stage, configured to perform a second one of said two operations, wherein said second one of said two operations comprises receiving said offset data and employing said offset data along with an instruction pointer corresponding to the indirect near jump macro instruction to generate a jump target address, and wherein said execute stage immediately follows said load stage in the microprocessor.

8. The apparatus as recited in claim 7, wherein said load-jump micro instruction proceeds through said load stage in single pipeline cycle.

9. The apparatus as recited in claim 7, wherein said load-jump micro instruction proceeds through said execute stage in a single pipeline cycle.

10. The apparatus as recited in claim 7, wherein said load stage forwards said offset data along with said load-jump micro instruction to said execute stage for generation of said jump target address.

11. The apparatus as recited in claim 7, wherein the indirect near jump macro instruction comprises an x86 indirect near jump macro instruction.

12. The apparatus as recited in claim 7, wherein said location is provided by a register within the microprocessor, and wherein the indirect near jump macro instruction specifies said register.

13. A mechanism in a pipeline microprocessor for performing an indirect near jump operation, comprising:
   a load-jump micro instruction, said load-jump micro instruction corresponding to an indirect near jump macro instruction received and translated by translation logic; and
   load logic, configured to receive said load-jump micro instruction, to retrieve offset data from a memory location, and to provide said offset data to execution logic in an immediately following stage of the pipeline microprocessor, wherein said execution logic generates a target address for the indirect near jump operation in a single pipeline cycle;

wherein said load-jump instruction directs said load to retrieve said offset data and also directs said execution logic to generate said target address.

14. The mechanism as recited in claim 13, wherein said load-jump micro instruction proceeds through said load stage in single pipeline cycle.

15. The mechanism as recited in claim 13, wherein said indirect near jump macro instruction comprises an x86 indirect near jump macro instruction.

16. The mechanism as recited in claim 13, wherein said memory location is stored in a register, and wherein said indirect near jump macro instruction prescribes said register.

* * * * *

UNITED STATES PATENT AND TRADEMARK OFFICE
CERTIFICATE OF CORRECTION

PATENT NO.       : 7,055,022 B1
APPLICATION NO.  : 10/279216
DATED            : May 30, 2006
INVENTOR(S)      : Col et al.

Page 1 of 1

It is certified that error appears in the above-identified patent and that said Letters Patent is hereby corrected as shown below:

Title Page (74) Attorney, Agent, or Firm entry should read:

Richard K. Huffman
James W. Huffman

Title Page (73) Assignee Name and Residence should read:

IP-First, LLC   Fremont, CA

Signed and Sealed this

Twelfth Day of September, 2006

JON W. DUDAS
*Director of the United States Patent and Trademark Office*